(12) United States Patent
Burr (10) Patent No.: US 10,270,524 B2
(45) Date of Patent: Apr. 23, 2019

(54) BROADBAND SATELLITE PAYLOAD ARCHITECTURE

(71) Applicant: Space Systems/Loral, LLC, Palo Alto, CA (US)

(72) Inventor: Douglas G. Burr, San Jose, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 647 days.

(21) Appl. No.: 14/685,302

(22) Filed: Apr. 13, 2015

(65) Prior Publication Data

US 2015/0295640 A1 Oct. 15, 2015

Related U.S. Application Data

(60) Provisional application No. 61/979,851, filed on Apr. 15, 2014.

(51) Int. Cl.
*H01Q 1/26* (2006.01)
*H01Q 3/36* (2006.01)
(Continued)

(52) U.S. Cl.
CPC ........... *H04B 7/2041* (2013.01); *H01Q 1/288* (2013.01); *H01Q 3/26* (2013.01); *H01Q 3/267* (2013.01);
(Continued)

(58) Field of Classification Search
CPC ............... H04B 7/2041; H04B 7/1851; H04B 7/18515; H01Q 25/007; H01Q 3/267;
(Continued)

(56) References Cited

U.S. PATENT DOCUMENTS

| | | | |
|---|---|---|---|
| 4,236,161 A | * | 11/1980 | Ohm ..................... H01Q 19/192 |
| | | | 342/352 |
| 5,561,397 A | | 10/1996 | Kumar |

(Continued)

FOREIGN PATENT DOCUMENTS

| | | |
|---|---|---|
| EP | 0 896 383 A2 | 2/1999 |
| EP | 1 184 940 A2 | 3/2002 |
| EP | 2 120 281 A1 | 11/2009 |

OTHER PUBLICATIONS

International Search Report and Written Opinion dated Sep. 28, 2015 issued in PCT/US2015/025888.

(Continued)

*Primary Examiner* — Bernarr E Gregory
*Assistant Examiner* — Freed H Mull
(74) *Attorney, Agent, or Firm* — Weaver Austin Villeneuve & Sampson LLP (57) ABSTRACT

A spacecraft includes a payload subsystem, the payload subsystem including a phased array of feed elements configured to illuminate an antenna reflector, a beam forming network (BFN) disposed proximate to the array of feed elements, and a plurality of power amplifiers disposed between the BFN and the array of feed elements. The BFN includes a plurality of variable amplitude and phase adjusting arrangements disposed between (i) m:1 power combiners that are communicatively coupled with the power amplifiers and (ii) at least one 1:n power splitter, where m is greater than 1, and n is greater than 2.

18 Claims, 8 Drawing Sheets

(51) Int. Cl.
*H01Q 3/28* (2006.01)
*H01Q 19/00* (2006.01)
*H04B 7/204* (2006.01)
*H01Q 1/28* (2006.01)
*H01Q 3/26* (2006.01)
*H01Q 19/17* (2006.01)
*H01Q 25/00* (2006.01)
*H04B 7/185* (2006.01)

(52) U.S. Cl.
CPC .............. *H01Q 3/28* (2013.01); *H01Q 3/36* (2013.01); *H01Q 19/17* (2013.01); *H01Q 25/007* (2013.01); *H04B 7/18515* (2013.01)

(58) Field of Classification Search
CPC .......... H01Q 3/36; H01Q 19/17; H01Q 1/288; H01Q 3/28; H01Q 3/26; H01Q 19/288; H01Q 3/30; H01Q 3/2676
USPC ............... 342/354; 455/12.1, 13.3, 13.4
See application file for complete search history.

(56) References Cited

U.S. PATENT DOCUMENTS

| | | | |
|---|---|---|---|
| 6,075,484 A | 6/2000 | Daniel | |
| 6,157,811 A | 12/2000 | Dent | |
| 6,169,513 B1* | 1/2001 | Cohen | H01Q 1/288 |
| | | | 342/354 |
| 6,246,364 B1 | 6/2001 | Rao | |
| 6,404,398 B1* | 6/2002 | Chen | H01Q 1/288 |
| | | | 342/368 |
| 6,571,081 B1 | 5/2003 | Reinhardt | |
| 7,242,368 B2* | 7/2007 | Thevenot | H01Q 5/00 |
| | | | 343/700 MS |
| 7,400,832 B2 | 7/2008 | Beacham | |
| 8,952,815 B2* | 2/2015 | Smith | H01Q 3/30 |
| | | | 235/385 |
| 9,373,896 B2 | 6/2016 | Runyon | |
| 9,374,145 B2 | 6/2016 | Angeletti | |
| 9,608,716 B1* | 3/2017 | Elwailly | H04B 7/18519 |
| 2003/0068979 A1* | 4/2003 | Sichi | H04B 7/18515 |
| | | | 455/13.3 |
| 2005/0176368 A1 | 8/2005 | Young | |
| 2007/0200780 A1 | 8/2007 | Hentosh et al. | |
| 2009/0009392 A1* | 1/2009 | Jacomb-Hood | H01Q 1/288 |
| | | | 342/374 |
| 2009/0262037 A1 | 10/2009 | Matyas et al. | |
| 2010/0164782 A1 | 7/2010 | Saha et al. | |
| 2011/0102263 A1 | 5/2011 | Angeletti | |
| 2011/0268158 A1 | 11/2011 | Miller et al. | |
| 2013/0154874 A1 | 6/2013 | Burr | |
| 2014/0241239 A1 | 8/2014 | Chang | |
| 2015/0009069 A1* | 1/2015 | Yun | H01Q 3/36 |
| | | | 342/368 |
| 2016/0301463 A1 | 10/2016 | Burr | |

OTHER PUBLICATIONS

U.S. Office Action dated Nov. 9, 2016 issued in U.S. Appl. No. 14/684,124.

Ueno, Kenji, "Properties of a Large Scale Multibeam Antenna Using a Phased Array Fed Reflector with Radially Aligned Elements," NTT Wireless Systems Laboratories, Japan, 0-7803-5639-X/99, 1999 IEEE, pp. 2298-2301.

EP Office Action dated Oct. 24, 2017 issued in EP Application No. 15734486.2.

EP Office Action dated Apr. 25, 2018 issued in EP Application No. 15734486.2.

* cited by examiner

Detail A
n=7; N=4

Detail B
n=19; N=12

Detail A

BROADBAND SATELLITE PAYLOAD ARCHITECTURE

CROSS-REFERENCE TO RELATED APPLICATIONS

This disclosure claims priority under 35 U.S.C. § 119 to U.S. Provisional Patent Application No. 61/979,851, filed Apr. 15, 2014, entitled "BROADBAND SATELLITE PAYLOAD ARCHITECTURE," and assigned to the assignee hereof, the disclosure of which is incorporated by reference, in its entirety, into the present disclosure for all purposes.

TECHNICAL FIELD

This invention relates generally to enabling an increased capacity broadband service from an Earth orbiting satellite, and particularly to a payload architecture for such a satellite.

BACKGROUND

The assignee of the present invention manufactures and deploys spacecraft for, inter alia, communications and broadcast services. Market demands for such spacecraft have imposed increasingly stringent requirements on spacecraft payloads. For example, broadband service providers desire spacecraft with increased data rate capacity at higher EIRP through each of an increased number of user spot beans operable from geosynchronous orbit altitudes in communication with small (<1 meter aperture) user terminals.

To meet the more stringent demands, a spacecraft capable of providing at least 500 Gbps total data bandwidth distributed across at least one hundred spot beams is desirable. The payload, desirably, should provide an aggregate effective isotropic radiated power (EIRP) in the forward direction of greater than 85 dBw so as to provide compatibility with user terminals having aperture diameters in the range of 0.5-1 meter.

Meeting the foregoing performance objectives with a conventional payload architecture while conforming to the mass and volume constraints imposed by conventional launch vehicles is infeasible. Thus, there is a need for a high power broadband spacecraft with an improved payload architecture.

SUMMARY

The present inventor has appreciated that a payload architecture for a satellite may be operable to provide, from an altitude over the earth of approximately 35,000 km, a combined forward and return data throughput exceeding 500 gigabits per second.

According to some implementations, the spacecraft includes a payload subsystem, the payload subsystem including a phased array of feed elements configured to illuminate an antenna reflector, a beam forming network (BFN) disposed proximate to the array of feed elements, and a plurality of power amplifiers disposed between the BFN and the array of feed elements. The BFN includes a plurality of variable amplitude and phase (VAP) adjusting arrangements disposed between (i) m:1 power combiners that are communicatively coupled with the power amplifiers and (ii) at least one 1:n power splitter, where m is greater than 1, and n is greater than 2.

In some examples, the beamforming coefficients of one or more of the VAP adjusting arrangements may be correctable by ground command. A failure of one or more of the power amplifiers may be compensatable by correcting, by ground command, the beamforming coefficients of one or more of the VAP adjusting arrangements.

In some examples, the plurality of power amplifiers in the beamforming network may be proximate to the array of feed elements.

In some examples, each VAP adjusting arrangement may be communicatively coupled with a single element, and at least some feed elements are coupled with multiple VAP adjusting arrangements. The phased array of feed elements may form a plurality of beams, each beam being formed by a center feed element, and six edge feed elements, the six edge feed elements being adjacent to and surrounding the center feed element. The center feed element may be communicatively coupled with a first VAP adjusting arrangement and each of the six edge feed elements may be communicatively coupled by way of respective ones of the m:1 power combiners with at least two VAP adjusting arrangements associated with adjacent beams that share the edge element.

In some examples, the respective ones of the m:1 power combiners may be proximate to the center feed element.

In some examples, m may equal 2 or 3 and n may equal 7.

In some examples, the BFN is configured to provide soft redundancy by allowing reoptimization of the beamforming coefficients in case of a failure of at least one of the power amplifiers.

According to some implementations, an apparatus includes a payload subsystem for a spacecraft, the payload subsystem including a phased array of feed elements configured to illuminate an antenna reflector, a beam forming network (BFN) disposed proximate to the array of feed elements, and a plurality of power amplifiers disposed between the BFN and the array of feed elements. The BFN includes a plurality of variable amplitude and phase (VAP) adjusting arrangements disposed between (i) m:1 power combiners that are communicatively coupled with the power amplifiers and (ii) at least one 1:n power splitter, where m is greater than 1, and n is greater than 2.

BRIEF DESCRIPTION OF THE DRAWINGS

Features of the invention are more fully disclosed in the following detailed description of the preferred embodiments, reference being had to the accompanying drawings, in which like reference numerals designate like structural element, and in which.

DETAILED DESCRIPTION

Specific exemplary embodiments of the invention will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when a feature is referred to as being "connected" or "coupled" to another feature, it can be directly connected or coupled to the other feature, or intervening features may be present. Furthermore, "connected" or "coupled" as used herein may include wirelessly connected or coupled. It will be understood that although the terms "first" and "second" are used herein to describe various features, these features should not be limited by these terms. These terms are used only to distinguish one feature from another feature. Thus, for example, a first user terminal could be termed a second user terminal, and similarly, a second user terminal may be termed a first user terminal without departing from the teachings of the present invention. As used herein, the term "and/or" includes any and all combinations of one or more of the associated listed items. The symbol "/" is also used as a shorthand notation for "and/or".

The terms "spacecraft", "satellite" and "vehicle" may be used interchangeably herein, and generally refer to any orbiting satellite or spacecraft system.

Figure 1:
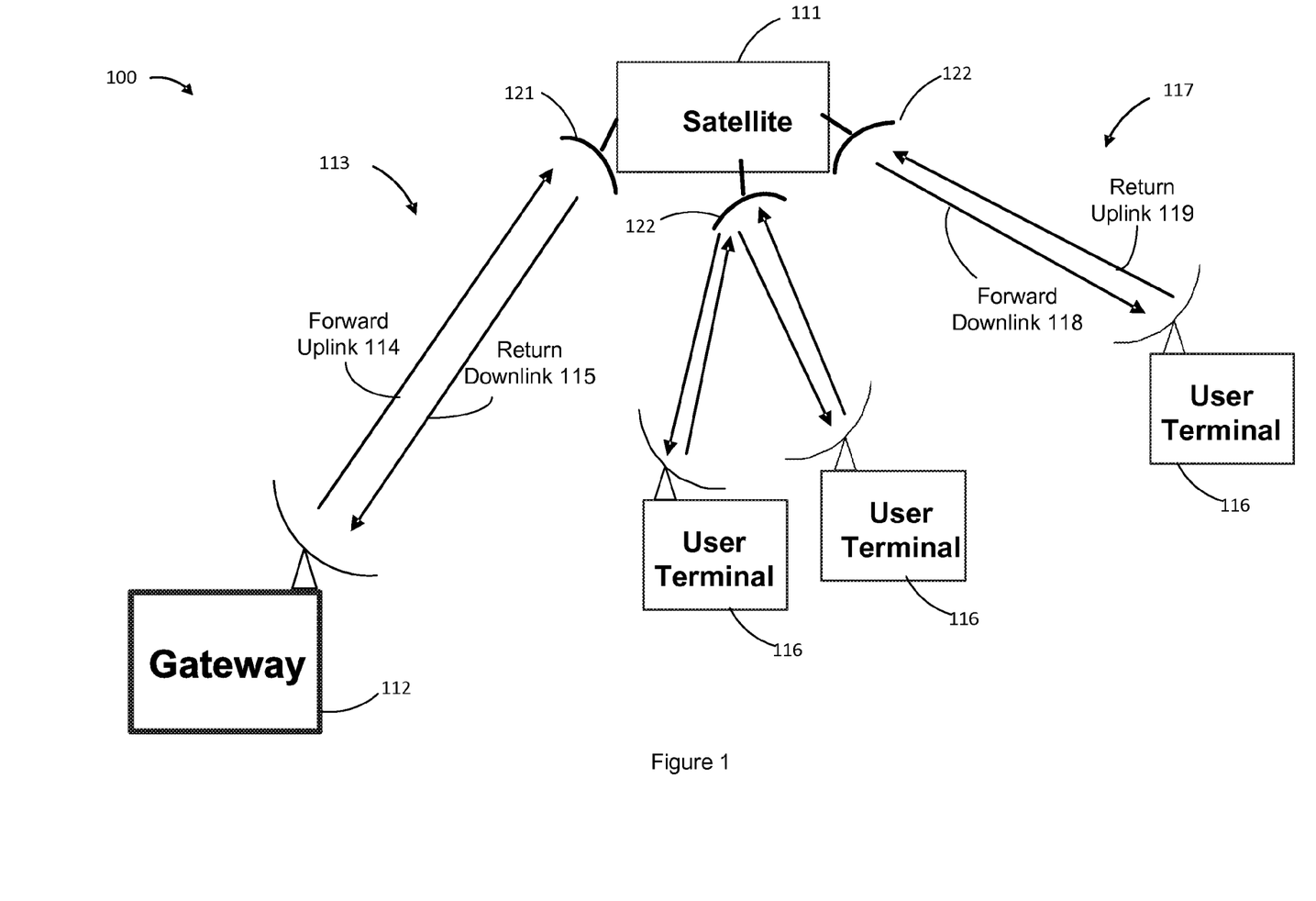
FIG. 1 illustrates a simplified diagram of a satellite communications network.

Referring to FIG. 1, a simplified diagram of a satellite communications network 100 is illustrated. The network includes a satellite 111, which may be located, for example, at a geostationary orbital location or in a low earth orbit. The satellite 111 may be communicatively coupled, via at least one feeder link antenna 121, to at least one gateway 112 and, via at least one user link antenna 122 to a plurality of user terminals 116. The at least one gateway 112 may be coupled to a network such as, for example, the Internet. Each gateway 112 and the satellite 111 communicate over a feeder link 113, which has both a forward uplink 114 and a return downlink 115. The user terminals 116 and the satellite 111 communicate over a user link 117 that has both a forward downlink 118 and a return uplink 119. The user link 117 and the feeder link 113 may operate in respective assigned frequency bands, referred to herein as the "user link band" and the "feeder link band".

The satellite 111 will ordinarily include a payload subsystem for, inter alia, processing signals traveling between the at least one gateway 112 and the user terminals 116. In some implementations, an architecture of the payload subsystem may provide dual frequency conversion and/or bandwidth aggregation as described in U.S. Pat. No. 8,660,482, assigned to the assignee of the present invention, the disclosure of which is hereby incorporated into the present application in its entirety. Put briefly, in such an architecture, the user link 117 includes a large number of small spot user antenna beams ("user spot beams"), not illustrated, communicatively coupled, on board the satellite 111, to the feeder link 113 consisting of a smaller number of gateway antenna beams, not illustrated. The feeder link 113 accommodates substantially more bandwidth than any single user spot beam. The gateway antenna beam may carry aggregated signals for distribution to any of the large number of user spot beams. Feeder link signals received at a feed array of the at least one satellite feeder link antenna 121 may be amplified and down converted on the satellite as a block, to an intermediate frequency band substantially lower than the user link band. Advantageously, the down conversion is performed proximate to the satellite feeder link antenna feed array. The aggregated, down-converted signals may then be routed, at the intermediate frequency, through the satellite and processed for transmission by a satellite user link antenna feed array over the user link 117. Prior to transmission over the user link 117, the aggregated, down-converted signals are up-converted to the user link band. Advantageously, the up-conversion is performed proximate to the satellite user link antenna feed array. In an embodiment, intermediate frequency signals may be distributed, filtered and up-converted to the user link frequency band prior to high power amplification. The amplified signals may then be coupled with the individual user beam downlink feed elements of the user link antenna feed array.

In some implementations, feeder link signals received at the feed array of the at least one satellite feeder link antenna 121 may be amplified and directly converted to the user link band.

One or more of the at least one feeder link antenna 121 and the user link antenna 122 may include a high efficiency multi-beam antenna (MBA) system of the type disclosed in U.S. Pat. Pub. No. 2013/0154874 assigned to the assignee of the present invention, the disclosure of which is hereby incorporated into the present application in its entirety. The MBA antenna system may generate a set of user spot beams that define a coverage area which may extend, in aggregate, across a large region on the ground. MBA's providing wide-band communications services from a geosynchronous satellite conventionally provide contiguous coverage of a region with a triangular lattice of overlapping circular antenna beams. These beams are conventionally formed using a close packed array of circular feed elements, also centered on a triangular lattice. The feed elements illuminate, for example, offset fed parabolic reflectors to provide the desired antenna gain. The MBA system may provide within the coverage region, a number of spot beams, using a "multi-color", frequency reuse scheme. The antenna reflector may be conventionally sized so as to produce a circular beam that is 4-4.5 dB down at the edge of coverage or may be substantially oversized with respect to that conventional design criterion. In some implementations, a subreflector may be disposed between the feed element array and the reflector. Moreover, the reflector and/or the subreflector, may not necessarily be parabolic, one or both may be otherwise shaped and/or flat.

In accordance with the presently disclosed techniques, a payload architecture for a satellite may be operable to provide, from an altitude over the earth of approximately 35,000 km, a combined forward and return data throughput exceeding 500 gigabits per second. In some implementations, the payload architecture may be configured such that the forward uplink 114 and the forward downlink 118 are operable to provide approximately 150 GHz of bandwidth from the at least one gateway 112 to the user terminals 116, while also being configured such that the return uplink 119 and the return downlink 115 are operable to provide approximately 75 GHz of bandwidth from the user terminals 116 to the gateway 112.

In some implementations, usage of aggregate available bandwidth is optimized by frequency reuse of spatially isolated user downlink and uplink antenna beams. Spatial isolation may be achieved using a "multi-colored" frequency plan such that adjacent user beams do not operate with the same frequency sub-band and polarization. The frequency plan may be chosen to provide the desired bandwidth per beam and the antenna architecture may be chosen to provide both high efficiency and high co-polarized carrier-to-interference ratio (C/I) required to optimize capacity of an RF link design.

In some implementations, the bandwidth allocated to the feeder link 113 may be many times larger than the bandwidth allocated to the user link 117 in order to minimize the total number of gateways 112 required by the system 100. For example, for a frequency plan that will support 1 GHz of forward downlink bandwidth for each user beam and 10 GHz of forward uplink bandwidth for each gateway, a gateway will support 10 user beams. An aggregate forward link bandwidth of 150 GHz would then require approximately 15 gateways 112.

Thus, the presently disclosed techniques contemplate a payload architecture that is operable to provide hundreds of channels to and from hundreds of user beams and dozens of gateway beams. The spacecraft payload subsystem is contemplated to be operable with, low cost (small, low power) user terminals and conventional gateways. The spacecraft, including the payload subsystem, is sized to be compatible for launch by conventional launch vehicles, such as Proton, Ariane, Sea Launch, Atlas, Delta, H2, and Falcon. These objectives may be achieved by one or more of the following disclosed innovative techniques.

In some implementations, the allocated user bandwidth may be divided into three frequency sub-bands, where each sub-band is assigned to both polarizations producing six channel/polarization combinations ("colors"). Each beam may be assigned two opposite polarizations with different frequency sub-bands. This two of six color frequency plan provides three color reuse in each polarization and maximizes the bandwidth per beam at ⅔ of the allocated user spectrum for each beam in a contiguous cluster of beams. This frequency plan approach also provides the maximum capacity performance while substantially avoiding cross polarization interference.

In some implementations, the payload subsystem includes one or more MBA's. Each MBA may include a single parabolic reflector, fed by an active phased array of feed elements including one hundred or more feed elements. In some implementations, a sub-reflector may be disposed between the reflector and the active phased array. A number of spot beams may be formed, where each spot beam is formed by a respective cluster of feed elements. For example, referring now to FIG. 2, a first beam 201 may be formed by a cluster of seven feed elements, including feed element A, which may be referred to as the center feed element, and feed elements B, C, D, E, F, and G, which are adjacent to and surround feed element A. As will be described below, a large number of beams, similar to the first beam 201 may be provided by a feed array, such that the beams are contiguous or overlapping.

Figure 2:
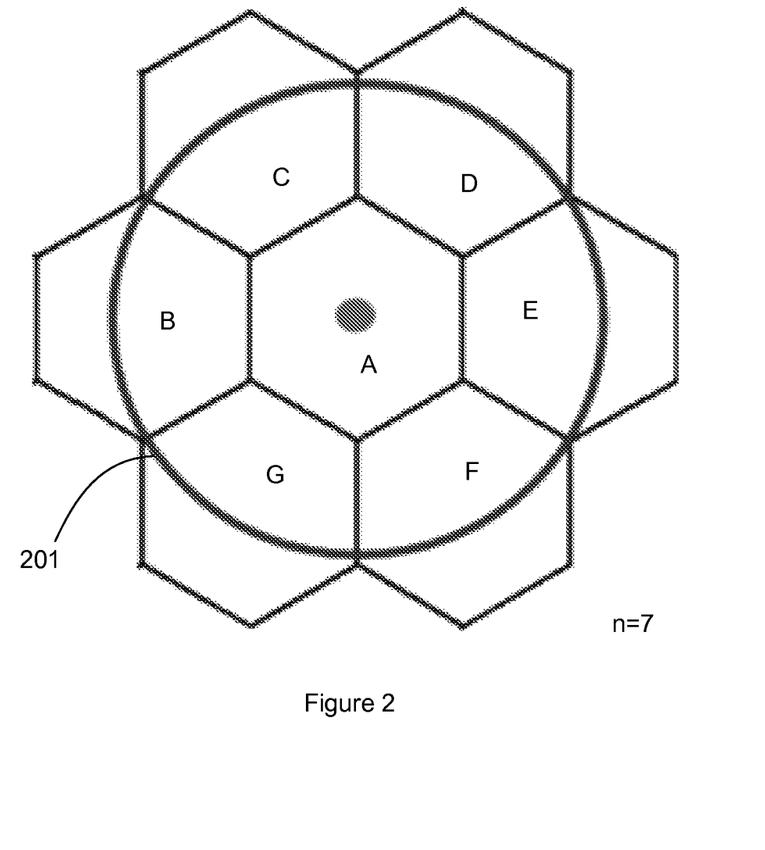
FIG. 2 illustrates a spot beam formed by a cluster of seven feed elements, according to an implementation.
Figure 3:
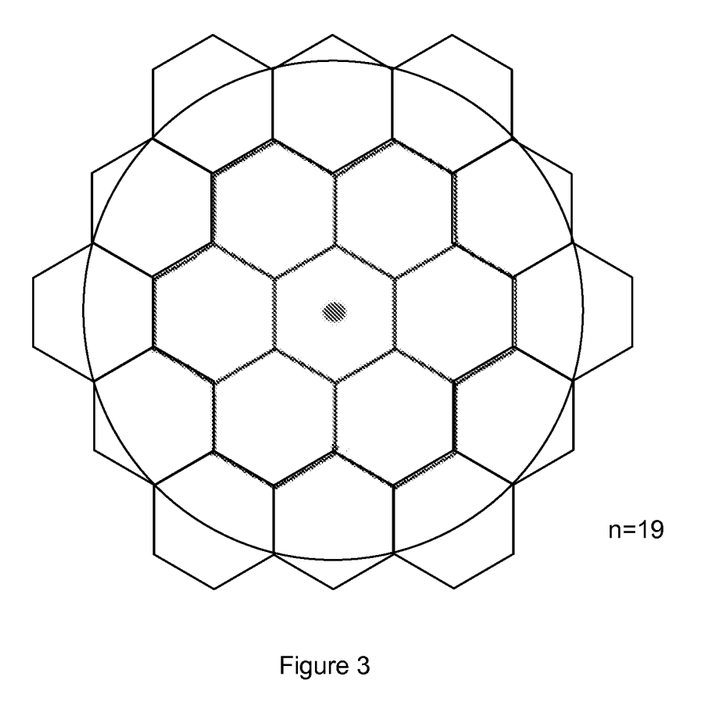
FIG. 3 illustrates a spot beam formed by a cluster of nineteen feed elements, according to another implementation.

In the illustrated example, the first beam 201 is defined by seven approximately hexagonal regions, each associated with a respective feed element A, B . . . , G. However, it should be noted that feed element A, B . . . , G may have a square, rectangular, hexagonal or circular cross section, for example. Furthermore, the quantity of feed elements making up the beam, referred to generically herein as 'n', may be smaller or greater than seven. For example, FIG. 3 illustrates an implementation where n=19.

For a given diameter of a reflector of an MBA system, a beam diameter and spacing may be determined for any particular desired operating frequency and antenna efficiency. An oversized reflector with respect to the chosen beam size may be used to increase antenna efficiency and beam isolation. Spacing between feed elements in the feed element array may be determined by the maximum size of the feed element for efficient beam forming and the size of the electronics package that is able to fit behind the feed elements.

The focal length and offset of the reflector may be selected so as to produce a beam deviation factor such that the beam spacing in the focal plane is the square root of 'N' times the feed element spacing in the focal plane, where 'N' is the ratio of feed elements to formed beams in a sufficiently large triangular lattice of feed elements.

Figure 4:
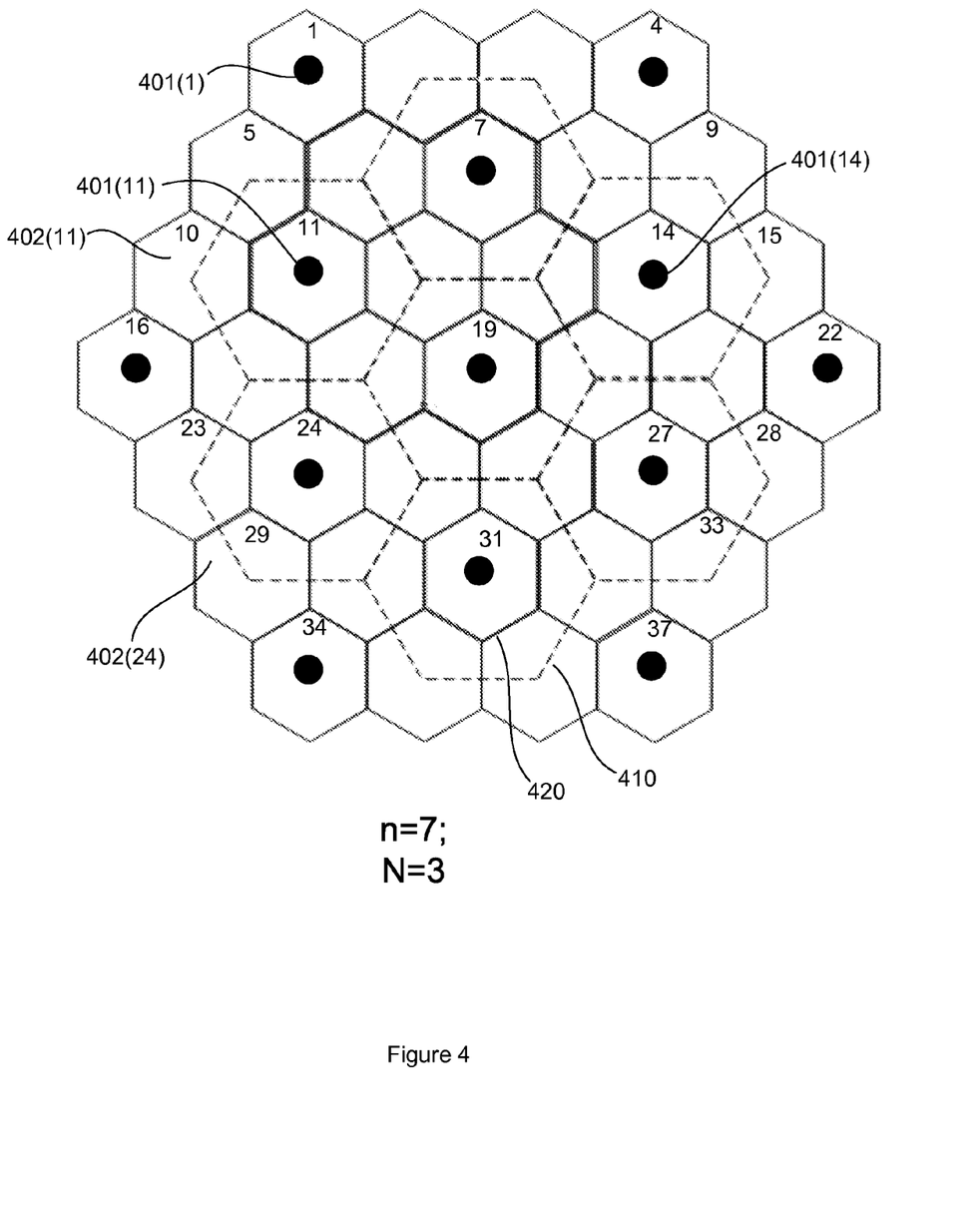
FIG. 4 illustrates an example of a beam pattern according to an implementation.

A better understanding of the term 'N' may be obtained by referring now to FIG. 4, which illustrates an example of a beam pattern where N=3. In the illustrated implementation, 37 feed elements include 13 center beam feed elements 401($i$), each associated with a formed beam 402($i$). Each center beam feed element may be related to a corresponding feed element, for example, center beam feed element 401 (14) corresponds with feed element 14. The illustrated beam pattern, corresponding to 13 center beam feed elements, may represent a small subset of a contemplated spot beam coverage pattern that may include one hundred or more spot beams. It will be appreciated that, in the illustrated implementation, the number of feed elements (37) is approximately 3 times the number of center beam feed elements (13) and that for a sufficiently large number of feed elements arranged in the illustrated lattice pattern of FIG. 4, the ratio of feed elements to center beam feed elements will closely approach three. Put another way, 'N' is simply the ratio of the area of a (dashed line) 'beam' hexagon 410 to the area of a (solid line) 'element' hexagon 420.

Figure 5:
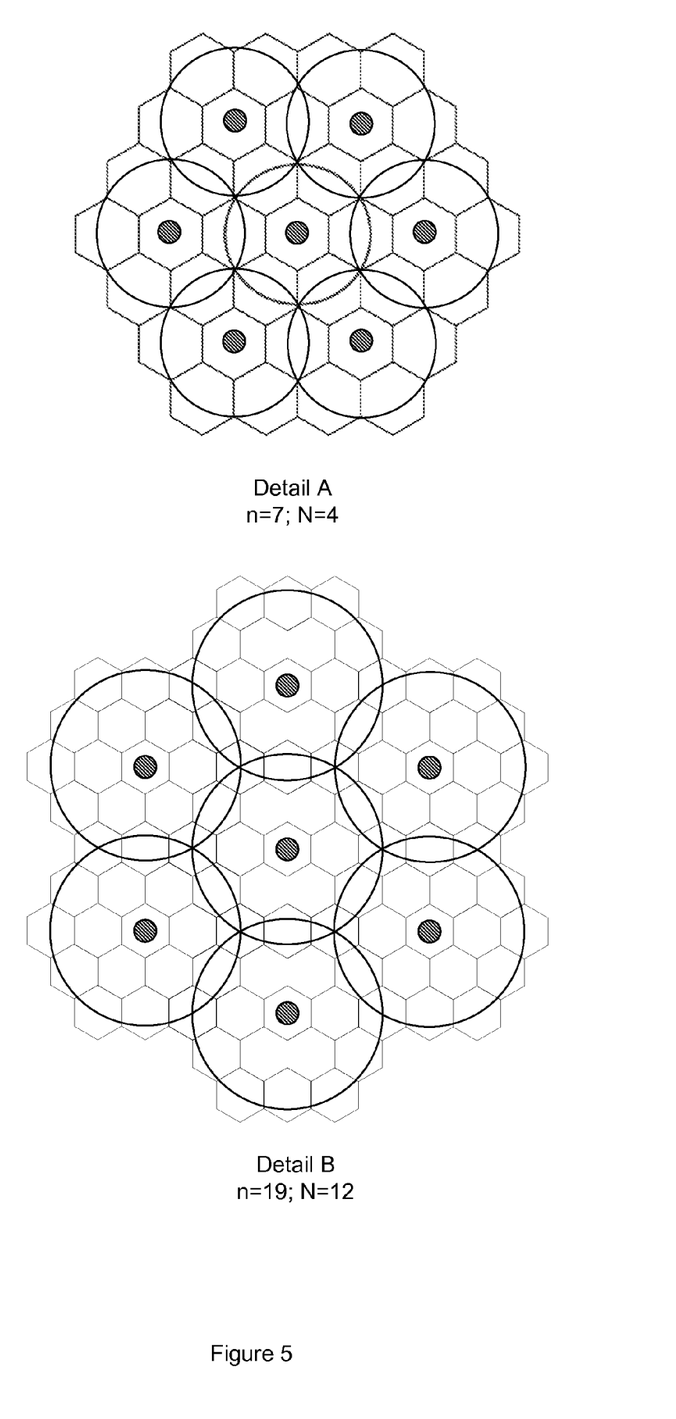
FIG. 5 illustrates an example of a beam pattern according to a further implementation.

Further illustrative examples are provided in FIG. 5, which depicts, in Detail A, an arrangement in which n=7 and N=4 and, in Detail B, an arrangement in which n=19 and N=12. Arrangements where n=37, and N=27 and similar, larger arrangements are also within the contemplation of the present disclosure.

In some implementations, the combination of n and N may be chosen to provide sufficient element beam pattern overlap to enable soft redundancy for element amplifiers. As used herein and in the claims the term "soft redundancy" means that in the event that one of the n amplifiers used to form the antenna beam fails, the beam shape may be reformed by re-optimizing the amplitude and phase coefficients to the remaining n−1 elements. Soft redundancy may obviate a need to provide spare amplifiers.

Figure 6:
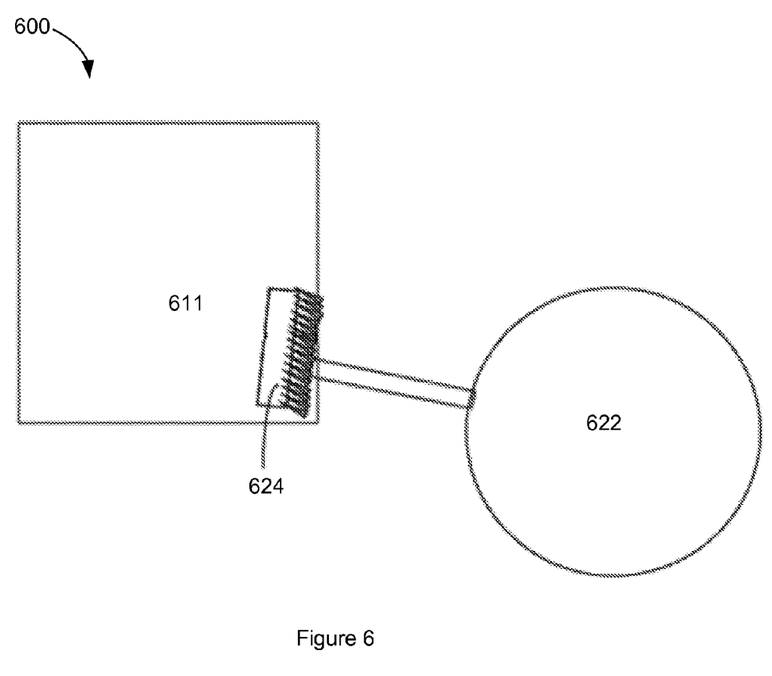
FIG. 6 illustrates an example of a satellite, according to an implementation.

In some implementations, a high capacity broadband satellite may be configured to provide a user link by way of a large number of spot beams arranged in a triangular lattice similar to one or more of the examples illustrated hereinabove. Referring now to FIG. 6, satellite 600 may include a main body 611 and an offset fed reflector 622. The reflector 622 is illuminated by a feed array 624, which may be configured as an active phased array having some tens or hundreds of feed elements. For clarity of illustration, a single reflector 620 and a single feed array 624, are depicted in FIG. 6, but it will appreciated that the satellite 600 may include two or more antennas systems each including a respective reflector and feed array.

Figure 7:
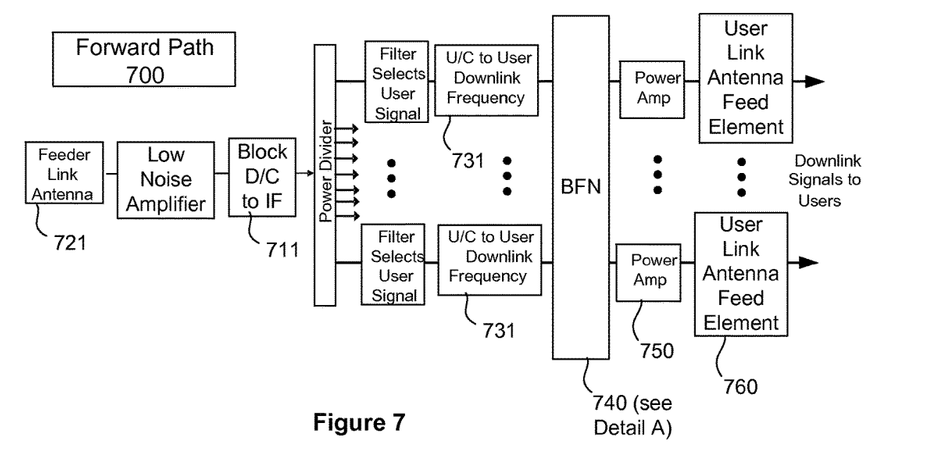
FIG. 7 illustrates a simplified block diagram of a satellite payload subsystem, according to an implementation.

Referring now to FIG. 7, a simplified block diagram of a portion of a payload subsystem of spacecraft 600 is illustrated. For simplicity of illustration, only forward path 700 of the payload system is illustrated. Data processed via forward path 700 may include data for each of a plurality of user spot beams. The data may have been modulated onto carriers at the gateway (not illustrated), and aggregated prior to being received by a feeder link antenna 721.

At the spacecraft, the aggregated forward path data may be block down converted 711 to an intermediate frequency (IF). In an embodiment, the IF may be a substantially lower frequency than the frequency assigned to the user link. Following this down-conversion, the aggregated forward path data may be transported to the vicinity of the user link spot beam feed array. There, bandwidth for each individual user spot beam may be filtered out of the aggregate, up-converted to the user link frequency, and forwarded to a beam forming network (BFN) 740.

Referring now to Detail A of FIG. 7, the BFN 740, in the illustrated implementation, is configured to perform seven element beam forming with three feed element spacing (n=7; N=3). The BFN 740 includes 1:7 power splitter 742, commandable variable amplitude and phase (VAP) adjusting arrangements 744, and 3:1 power combiners 746. In some implementations, one or more of the VAP adjusting arrangements 744 may be implemented as a monolithic microwave integrated circuit (MMIC) chip. Each of seven VAP adjusting arrangements 744 is communicatively coupled with a single power amplifier 750, which is communicatively coupled with a single corresponding feed element 760. At least one power amplifier 750 may be communicatively coupled with the multiple VAP adjusting arrangements 744 by way of a respective 3:1 power combiner 746, as described in more detail below in connection with FIGS. 8A and 8B.

Figure 8A:
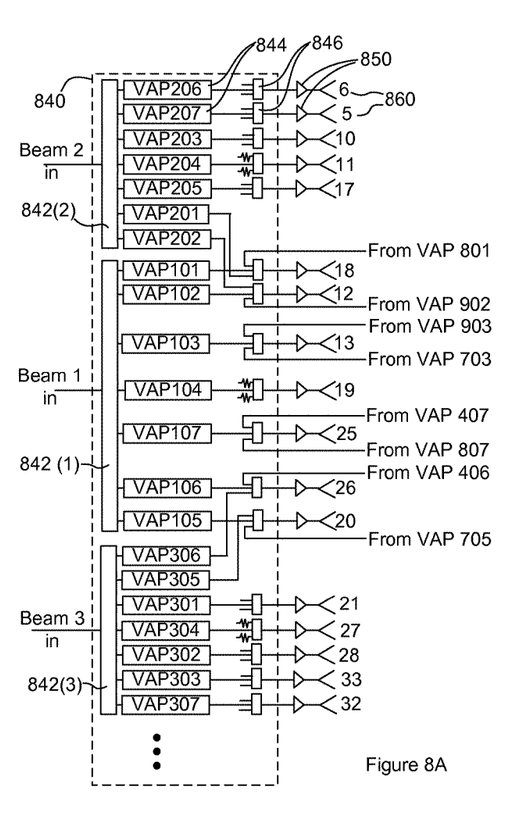
FIG. 8A illustrates an example of a beam forming network, according to an implementation.
Figure 8B:
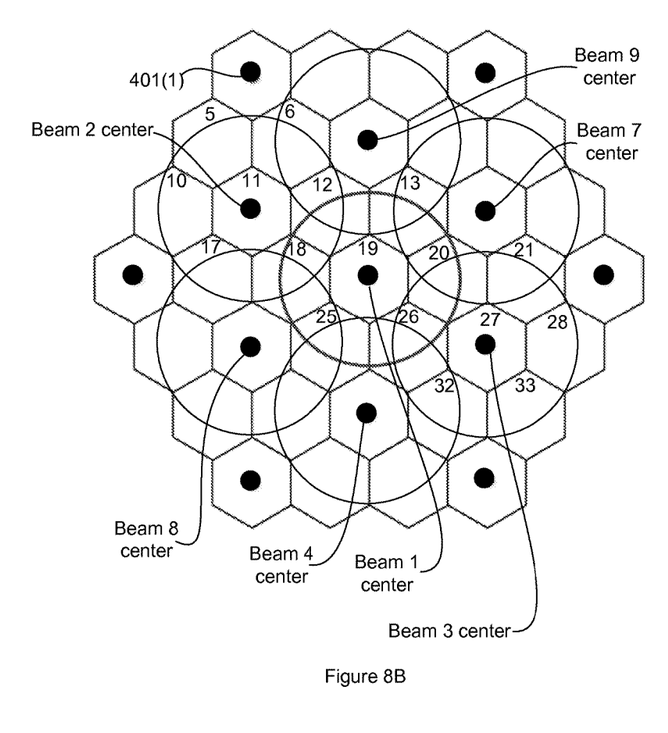
FIG. 8B illustrates a spot beam lattice pattern formed by the beam forming network of FIG. 8A.

Referring now to FIG. 8A, an illustration of an example beam forming network 840 will be described. In the illustrated example, the beam forming network 840 is configured to form the spot beam lattice pattern illustrated in FIG. 8B. For convenience, therefore, each feed element 860 illustrated in FIG. 8A is assigned an identification number, (i.e., 6, 5, 10, 11, etc.) that corresponds to a numbered cell in the spot beam lattice pattern illustrated in FIG. 8B. The focal length and offset of the reflector 620 may be selected so as to produce a beam deviation factor such that the beam spacing in the focal plane is the square root of 'N' times the feed element spacing in the focal plane, where 'N' is the ratio of feed elements to formed beams in a sufficiently large triangular lattice of feed elements.

The beam forming network 840 includes 1:7 power splitters 842. In the illustrated implementation, each of Beam 1, centered at feed element 19, Beam 2, centered at feed element 11, and Beam 3, centered at feed element 27, is associated with a respective 1:7 power splitter 842. Each 1:7 power splitter 842 is communicatively coupled with seven respective VAP adjusting arrangements 844. For convenience of nomenclature, each VAP adjusting arrangement is assigned an identifying number of the form X0Y, where X indicates the beam number associated with the 1:7 power splitter 842 to which the VAP adjusting arrangement 844 is coupled, and Y is an integer serial number 1, 2, 3, 4, 5, 6, or 7.

Each VAP adjusting arrangement 844 is communicatively coupled with a single 3:1 power combiner 846. However, at least some of the 3:1 power combiners 846 are communicatively coupled with multiple VAP adjusting arrangements 844. As a result, at least some feed elements 860 are communicatively coupled with multiple VAP adjusting arrangements 844. In the illustrated implementation, for example, center feed elements 11, 19, and 27 are each communicatively coupled with a single VAP adjusting arrangement (respectively, VAP 204, VAP 104 and VAP 304, while "edge" feed elements (adjacent to and surrounding a respective center feed element) are communicatively coupled with three VAP adjusting arrangements 844. A respective 3:1 power combiner 846 associated with each edge element of a beam may be proximate to the center feed element of the beam.

More particularly, as FIG. 8A illustrates in detail with respect to Beam 1, center feed element 19 is communicatively coupled with a single VAP adjusting arrangement, VAP 104. Edge feed element 18 is communicatively coupled with three VAP adjusting arrangements, VAP 101, VAP 201 and VAP 801. Similarly, edge feed element 12 is communicatively coupled VAP 102, VAP 202 and VAP 902; edge feed element 13 is communicatively coupled with VAP 103, VAP 703 and VAP 903; edge feed element 25 is communicatively coupled VAP 107, VAP 407 and VAP 807; edge feed element 26 is communicatively coupled with VAP 106, VAP 306 and VAP 406; and edge feed element 20 is communicatively coupled with VAP 105, VAP 305 and VAP 705.

The above-described approach reduces the total number of feed elements for a contiguous cluster of beams formed with a single reflector while maintaining the same n-element feed cluster geometry required to form any single beam.

In some implementations, power amplifiers 850 may include solid-state power amplifiers (SSPAs). Each SSPA 850 may be disposed between and proximate to the 3:1 power combiners 846 and the feed elements 860. In some implementations, the SSPA 850 may include gallium nitride semiconductors. Each feed element 860 may be communicatively coupled with a separate power amplifier 850 for each respective polarization at which the feed element 860 is intended to operate. The power amplifiers 850, in some implementations, may be located very near to the feed elements 860 in order to minimize line losses.

Moreover, referring again to FIG. 7, it is contemplated that up converters 731, the BFN 740, and the power amplifiers 750 may be located in close proximity to the array of feed elements 760. As a result, output waveguides, that would be required in the absence of the present teachings, may be omitted from forward path 700. As a result, the number of components, mass and complexity of a phased array are all reduced.

According to the presently disclosed techniques, beamforming coefficients of beam amplitude and phase may be adjusted, by ground command, for example, for the beam location in the feed plane. As a result, relative to a single feed per beam multiple aperture predecessor design, a significant reduction in scan distortion and improvement in scan range and co-polarized C/I required by the two of six frequency plan may be obtained. In some implementations, this active phased array feed cluster architecture is coupled with a high efficiency single reflector MBA. The commandable nature of the presently disclosed BFN provides soft redundancy by allowing re-optimization of the beamforming coefficients in case of a power amplifier failure, thereby permitting to omit R-switches that would ordinarily be contemplated by the prior art.

Although the description above relates to a forward path of a satellite communication subsystem, it will be appreciated that the same architecture may be applied to the return path.

Thus, a high capacity broadband satellite payload architecture has been described. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
a payload subsystem, the payload subsystem including
a phased array of feed elements configured to illuminate an antenna reflector;
a beam forming network (BFN) coupled with the array of feed elements; and
a plurality of power amplifiers disposed between the BFN and the array of feed elements, wherein:
the phased array of feed elements forms a plurality of beams, each beam being formed by a center feed element, and a plurality of edge feed elements surrounding the center feed element;
the BFN includes a plurality of variable amplitude and phase (VAP) adjusting arrangements disposed between (i) m:1 power combiners that are communicatively coupled with the power amplifiers and (ii) at least one 1:n power splitter;
each VAP adjusting arrangement is communicatively coupled with a single respective one of the feed elements, and at least some of the feed elements are coupled with multiple VAP adjusting arrangements such that the payload subsystem includes more VAP adjusting arrangements than feed elements;
each center feed element is communicatively coupled by way of a single respective VAP adjusting arrangement with a single respective power 1:n power splitter and at least some edge feed elements are communicatively coupled by way of respective ones of the m:1 power combiners with two or more 1:n power splitters; and
m is greater than 1, and n is greater than 2.

2. The spacecraft of claim 1, wherein the spacecraft is configured to receive a ground command and beamforming coefficients of one or more of the VAP adjusting arrangements are correctable by the ground command.

3. The spacecraft of claim 2, wherein a failure of one or more of the power amplifiers is compensatable by correcting, by the ground command, the beamforming coefficients of one or more of the VAP adjusting arrangements.

4. The spacecraft of claim 1, wherein the plurality of power amplifiers are coupled with the array of feed elements.

5. The spacecraft of claim 1, wherein the plurality of feed elements consists of six edge feed elements disposed adjacent to and surrounding the center feed element.

6. The spacecraft of claim 5, wherein the center feed element is communicatively coupled with a first VAP adjusting arrangement and each of the six edge feed elements is communicatively coupled by way of respective ones of the m:1 power combiners with at least two VAP adjusting arrangements associated with adjacent beams that share the edge element.

7. The spacecraft of claim 6, wherein the respective ones of the m:1 power combiners are coupled with respective ones of the edge feed elements.

8. The spacecraft of claim 1, wherein m equals 2 or 3 and n equals 7.

9. The spacecraft of claim 1, wherein the BFN is configured to provide soft redundancy by allowing reoptimization of the beamforming coefficients in case of a failure of at least one of the power amplifiers.

10. An apparatus comprising:
a payload subsystem for a spacecraft, the payload subsystem including:
a phased array of feed elements configured to illuminate an antenna reflector;
a beam forming network (BFN) coupled with the array of feed elements; and
a plurality of power amplifiers disposed between the BFN and the array of feed elements, wherein:
the phased array of feed elements forms a plurality of beams, each beam being formed by a center feed element, and a plurality of edge feed elements surrounding the center feed element;
the BFN includes a plurality of variable amplitude and phase (VAP) adjusting arrangements disposed between (i) m:1 power combiners that are communicatively coupled with the power amplifiers and (ii) at least one 1:n power splitter;
each VAP adjusting arrangement is communicatively coupled with a single respective one of the feed elements, and at least some of the feed elements are coupled with multiple VAP adjusting arrangements such that the payload subsystem includes more VAP adjusting arrangements than feed elements;
each center feed element is communicatively coupled by way of a single respective VAP adjusting arrangement with a single respective power 1:n power splitter and at least some edge feed elements are communicatively coupled by way of respective ones of the m:1 power combiners with two or more 1:n power splitters; and
m is greater than 1, and n is greater than 2.

11. The apparatus of claim 10, wherein the spacecraft is configured to receive a ground command and beamforming coefficients of one or more of the VAP adjusting arrangements are correctable by the ground command.

12. The apparatus of claim 11, wherein a failure of one or more of the power amplifiers is compensatable by correcting, by the ground command, the beamforming coefficients of one or more of the VAP adjusting arrangements.

13. The apparatus of claim 10, wherein the plurality of power amplifiers are coupled with the array of feed elements.

14. The apparatus of claim 10, wherein the plurality of feed elements consists of six edge feed elements disposed adjacent to and surrounding the center feed element.

15. The apparatus of claim 14, wherein the center feed element is communicatively coupled with a first VAP adjusting arrangement and each of the six edge feed elements is communicatively coupled by way of respective ones of the m:1 power combiners with at least two VAP adjusting arrangements associated with adjacent beams that share the edge element.

16. The apparatus of claim 15, wherein the respective ones of the m:1 power combiners are coupled with respective ones of the edge feed elements.

17. The apparatus of claim 10, wherein m equals 2 or 3 and n equals 7.

18. The apparatus of claim 10, wherein the BFN is configured to provide soft redundancy by allowing reoptimization of the beamforming coefficients in case of a failure of at least one of the power amplifiers.

* * * * *